United States Patent Office 3,535,419
Patented Oct. 20, 1970

3,535,419
VETERINARY COMPOSITIONS AND METHODS
Jacob C. Siegrist, Los Altos, and Martin Katz, Los Altos Hills, Calif., assignors to Syntex Corporation, Panama, Panama, a corporation of Panama
No Drawing. Filed Dec. 15, 1965, Ser. No. 514,135
Int. Cl. A61k 27/12, 17/06
U.S. Cl. 424—22  9 Claims The present invention relates to novel veterinary compositions and methods and is particularly directed to a method of supplying a therapeutic agent to a ruminant at a substantially fixed rate over an extended but finite period and to the specific compositions which render this method feasible.

The administration to animals, over extended periods, of various substances such as vitamins, hormones, antibiotics and the like is known to often increase the rate of growth of the animal and to increase the feed efficiency. Other agents such as anthelmintics and trace elements are frequently administered over long periods of time for both therapeutic and prophylactic purposes. To avoid the necessity of repeating daily doses over these periods, specialized routes of administration have been developed by the art. Thus for example, estrogenic hormones have been administered by the use of skin implants which slowly release the active ingredients; various antibiotics and vitamins have been admixed with the animal's feed so as to be continually consumed by the animal; and trace elements have been supplied to ruminants in the form of a permanent bolus which permanently lodges in the animal's stomach, releasing its medicament over extremely long periods of time up to the life of the animal.

Each of these methods finds useful applications but each suffers from serious drawbacks which preclude widespread use. The last method of a permanent bolus is suitable for a single administration but is not adaptable to repeated use. Such compositions are of a permanent nature and comprise a durable matrix such as steel, aluminum, cement, clay, plastic, etc., often fired at extremely high temperatures to further increase durability. In view of their high density and durability, such compositions, once administered, remain in the stomach indefinitely, even after the supply of active ingredient is exhausted. Thus while highly suitable for supplying trace elements, such compositions are unsatisfactory for administering substances at a fixed rate over a shorter but finite period of time and are unsuitable for applications which envision repeated use since such would result in an unwanted and accumulation of exhausted matrices in the ruminant's stomach.

Implants and feed additives on the other hand, can be used repetitively. However, in the case of implants, problems arise in having unwanted residues, in requiring skilled administration and in being subject to various rates of release, depending upon the technique and site of implant. Administration of a therapeutic agent in a feed mix suffers from the fact that the actual and effective dose is dependent upon the feeding habits of the animal, thus permitting uncontrolled overdosing and underdosing.

It has now been discovered that various therapeutic agents can be administered to ruminants in the form of the veterinary compositions described herein. These compositions release the therapeutic agent at a substantially fixed rate over an extended but finite period of time; i.e., for a known and predetermined period of time which is longer than that for which the drug would be effective if administered via the usual oral route. Moreover, these compositions fully disintegrate during this time, thus permitting repeated use.

Any therapeutic agent which in veterinary practice can be administered orally may be incorporated in these compositions. Typical of these are vitamins, anthelmintics, anti-inflammatory agents, estrogenic hormones, progestational hormones, anti-bloat agents, antibiotics, etc. The use and value of such compositions may be better understood through the following specific reference to the use of progestational agents in the synchronization of estrus.

Through the utilization of artificial insemination, it has been possible to improve the quality of livestock and to render large scale breeding more economical and convenient. This is particularly true in the case of non-range animals such as dairy cattle. But while artificial insemination finds wide use in non-range livestock, its use is severely curtailed in the case of range livestock. Thus only about 1% of the beef cattle in this country are bred through this method, the principal drawbacks being the small percentage of animals in a herd which are in estrus at a given time and the lack of predictability with respect to a given animal as to when estrus will occur.

With the advent of agents capable of controlling and timing fertility, it is possible to bring such animals into heat at a predetermined time and indeed to bring substantially an entire herd into heat at the same time (or in the case of large herds, on a staggered schedule) in order to conduct the insemination more conveniently and economically. Thus a progestational agent is first supplied for the predetermined period at a regular rate so as to suppress estrus. Upon termination of the administration of the progestational agent, estrus will occur shortly thereafter; e.g., in from 2 to 6 days in the case of cows. However with such animals as beef cattle, such a requisite administration regimen is difficult if not impossible to maintain. Being range fed, the use of feed additives is impossible. Implants lack a sufficiently sharp and consistent endpoint to be predictable. Permanent boluses, while perhaps being adaptable through experimentation, lack, in their present stage of development, a sufficiently controlled rate of release to be predictable and morover can be utilized only once or twice with one animal.

However, by administering the progestational agent in a veterinary composition of the present invention, it is possible to obtain in a ruminant a substantially uniform rate of release over a predetermined time with a sharp endpoint. Thus by virtue of its formulation, the veterinary composition of this invention lodges in the rumen or reticulum of the stomach, which since the two are equivalent in this context, are hereafter referred to as the rumeno-reticular portions of the stomach. Having a substantially fixed rate of release, which is proportional to the rate of disintegration of the composition, the progestational agent is gradually released for an extended but finite time with total disintegration of the composition occurring at the end of this time. At this point, the supply of progestational agent has been exhausted and estrus accordingly follows. It is thus possible to take range cattle having unknown estrus cycles and synchronize these cycles so as to occur at predetermined times. Upon the observation of estrus, insemination can be performed in the usual manner. Any of the usual orally active progestational agents such as 6-chloro-17α-acetoxy-$\Delta^{4,6}$-pregnadiene-3, 20-dione; 17α-ethynyl - 19 - nortestosterone; 17α-ethynyl-$\Delta^{5(10)}$-estren-17-ol-3-one, and the like, may be used for the foregoing purpose. Indeed, since this invention is directed at a method of and compositions for permitting administration of such agents and not at these agents themselves, it is anticipated that this method and composition will be equally useful with agents to be developed in the future.

With respect to the compositions per se, these will comprise as a first major component, one or more highly water insoluble solid wax, fat, oil, fatty acid amide, fatty acid ester, fatty amide alcohol, or polymer; as a second major component, a high-density, non-toxic metal derivative; and as a third major component, the particular therapeutic agent to be administered. To this may be added various adjuncts to aid in processing or to modify the properties of the principal components. Thus with oils, substances such as aluminum stearate may be added to cause gelling so as to obtain a solid material. Other adjuncts which may be added are described below.

Suitable substances for use as the first component include natural oils such as peanut oil, coconut oil and the like, as well as their hydrogenated derivatives; fatty acids such as lauric acid, myristic acid, palmitic acid, oleic acid, stearic acid, arachidic acid, behemic acid, lignoceric acid, and the like; fatty alcohols such as lauryl alcohol, myristyl alcohol, cetyl alcohol, stearyl alcohol, and the like; fatty amides such as those of the above fatty acids, e.g., lauramide, stearamide, etc.; fatty acid esters including those of fatty alcohols, e.g. cetyl plamitate; mono and diesters of glycerine, e.g., glyceryl monostearate, glyceryl dioleate, etc.; mono and fatty acid diesters of propylene glycol as well as mono and diesters of polyethylene glycol; natural organic waxes such as beeswax, carnauba wax, bayberry wax, candeilla wax, and the like; paraffin and hydrocarbon waxes; petrolatum; polyolefins such as polyethylene, polypropylene, etc,; arcylics such as polymethacrylate, including acylic copoplymers; shellacs; resins; and the like. In the case of polymers, a powdered form rather than a molded or extruded form is employed.

Suitable materials for the second component include non-toxic metal derivatives of high density and low water solubility such as barium salts, e.g., barium sulfate; bismuth salts such as bismuth subcarbonate, bismuth subnitrate, bismuth subchloride; calcium salts such as calcium carbonate; metal oxides such as magnesium oxide, and the like. The metal derivative is combined with the first component in a quantity sufficient to provide a final density for the composition of at least 1.5 g./cm.$^3$ and preferably at least 1.9 g./cm.$^3$. While it is thus desirable to employ metal salts having the highest possible density, such as bismuth derivatives, the use of lower density materials such as barium sulfate is often preferred for economic reasons.

The active ingredient may be any of a wide range of substances as described above, but will be present in a total amount sufficient to release its predetermined amount at a fixed rate over the life of the composition, i.e., the period of disintegration.

In preparing these compositons, generally the first and third components are intimately mixed, either through the use of a solvent, such as methanol, or by melting the first component and adding the third to this melt. This mixture is then used to granulate the high density second component and after screening, if desired, the granulation is compressed, as with a hydraulic press or a regular commercial-type tablet machine, at a pressure of from about 1000 to about 5000 lbs./in.$^2$, preferably 1500 to 4000 lbs./in.$^2$, into suitable shapes. As an alternative to compression, the molten ingredients are poured into a mold and allowed to solidify.

Generally it has been found in the case of estrus synchronization in cattle that the composition should have a total weight of about 20 g. to about 30 g. and formulated to disintegrate over a period of about 18 to 20 days. In the case of sheep, the composition can be proportionally smaller, and thus shorter acting, so as to disintegrate over a period of 14 to 16 days. Sufficient weight is required to prevent the animal from throwing off the compositions, either through regurgitation or by passage through the reticulo-omassal orifice into the remainder of the gastro-intestinal tract. The configuration is not critical. A typical one used for cattle is a cylinder of about one inch in height and about 0.5 inch in radius. Other configurations, provided they have a substantially regular surface, may be compounded for other animals.

The rate of release of the therapeutic agent and disintegration of the composition is inversely proportional, within limits, to the pressure of compression. Within the range of 100 to 5000 lbs./in.$^2$ the rate of disintegration remains relatively constant for a given pressure, however, the higher the pressure, the slower the rate. For each formulation, there is a pressure over which further increases in pressure fail to cause significant changes in the disintegration rate. Below certain pressures, insufficient cohesion is obtained and accelerated rates of disintegration are observed. A preferred pressure is in the range of from 1500 to 4000 lbs./in.$^2$.

The rate of release is also dependent upon the nature of the first component. Thus the use of a very high hydrophobic substance such as carnauba wax produces an extremely long-lasting composition, e.g., in the order of magnitude of 100 days, depending upon the degree of compression. Other materials, such as glyceryl monostearate, have faster rates of disintegration, e.g., 10 g. at a compression of about 4000 lbs./in.$^2$ provides a composition lasting about 30 days. To provide for intermediate period of release, two or more materials having different rates can be combined in various proportions with this mixture being used as the first component. The precise relationship between the ratios of two such materials and their rate of disintegration will of course depend upon the particular materials selected. Varying the relative proportions of the particular materials, will produce a corresponding variation in the rate of release. Thus for the two examples given above, a composition utilizing a mixture of 70% glyceryl monstearate and 30% carnauba wax was found to have an average daily rate of release, for a 15 day sampling, of approximately twice that of a composition utilizing 67% glyceryl monostearate and 33% carnauba wax.

The rate of release can also be varied by introducing an amount of an inert compatible material of higher water solubility. Such materials include polyethylene glycol, sugars such as lactose, sucrose, etc., gums such as gum arabic, agar, gum tragacanth; gelatin; methyl cellulose; polyvinylpyrrolidone, and the like. Thus the rate of release of a composition utilizing 100% glyceryl monostearate can be approximately doubled through the use of 80% glyceryl monostearate and 20% polyethylene glycol, so that whereas a veterinary composition utilizing only glyceryl monostearate might be formulated to disintegrate in about 30 days, a composition identically formulated but employing 80% glyceryl monostearate and 20% polyethylene glycol would disintegrate in approximately 15 days. With these particular ingredients, preferred combinations will have at least 1.5 times as much glyceryl monostearate (or other glyceryl fatty acid monoesters) as there is polyethylene glycol. One valuable composition is that containing from about 40 to about 24 parts by weight of glyceryl monostearate, from 0 to about 16 parts by weight of polyethylene glycol, from about 50 to about 70 parts by weight of barium sulfate and sufficient therapeutic agent to supply the minimum daily dose over the life of the composition.

It has been found that the precise design and commercial standardization of veterinary compositions of this invention can be greatly facilitated through in vitro studies. In this respect the device of Souder et al., Drug Standards, 26, 77 (1958) is of great value in conducting tests with these compositions, particularly when fistulated animals are not available. While the rate of disintegration in such as in vitro apparatus is not identical to that obtained in vivo, the relationship of rate of disintegration to variation in compositon follows identical curves and the in vivo disintegration rate can thus be readily determined from the in vitro disintegration rates.

The following examples will serve to further typify the nature of this invention as to the effect of modifications and variations in composition and formulation. These examples are merely representative and should not be construed as being exhaustive in every possible variation nor as being limitative of the scope of this invention.

EXAMPLE 1

| Ingredient: | Amount, G. |
|---|---|
| Glyceryl monostearate | 345 |
| Polyethylene glycol (Carbowax 4000) | 55 |
| Barium sulfate | 592 |
| 6 - chloro - 17α - acetoxy-$\Delta^{4,6}$-pregnadiene-3,20-dione | 8 |

The glyceryl monostearate and polyethylene glycol are combined and melted. The 6-chloro-17α-acetoxy-$\Delta^{4,6}$-pregnadiene-3,20-dione is added and mixed and the resulting melt is employed to granulate the barium sulfate. The cooled mass is screened and 25 g. portions are compressed in a hydraulic press using a punch and die of 0.5 inch radius and 1 inch height at a pressure of 4000 lbs./in.$^2$. There are thus obtained 40 cylinders having a density of approximately 1.9 g./cm.$^3$ and containing 200 mg. of 6-chloro-17α-acetoxy-$\Delta^{4,6}$pregnadiene-3,20-dione. Each cylinder, upon oral administration to an adult normal cow, will lodge in the rumen or reticulum and release approximately 10 mg. of steroid per day for 20 days. Estrus will follow shortly thereafter.

EXAMPLE 2

Individual batches were prepared in accordance with the procedure of Example 1, using however the following proportions:

| Ingredient | A | B | C |
|---|---|---|---|
| Glyceryl monostearate | 160 | 240 | 320 |
| Polyethylene glycol (Carbowax 4000) | 240 | 160 | 80 |
| Barium sulfate | 600 | 600 | 600 |
| 6-chloro-17α-acetoxy-$\Delta^{4,6}$-pregnadiene-3,20-dione | 7.2 | 7.2 | 7.2 |

These compositions were administered to two fistulated cows and were removed via the fistula and examined periodically. Composition A was found to have a disintegration rate of 7.20 g./day and released approximately 85 mg. of steroid per day for 3 to 4 days. Composition B was found to have a disintegration rate of 3.00 g./day and released approximately 46 mg. of steroid per day for 8 to 9 days. Composition C was found to have a disintegration rate of 1.54 g./day and released approximately 11 mg. of steroid per day for 16 days. All compositions remained in the rumeno-reticular portions of the stomach until totally disintegrated.

EXAMPLE 3

To a melt of 400 g. of glyceryl monostearate are added 7.2 g. of 6-chloro-17α-acetoxy-$\Delta^{4,6}$-pregnadiene-3,20-dione. Six hundred grams of barium sulfate are then granulated with this mixture and after cooling and screening, this mixture is compressed into 25 g. cylinders according to the procedure of Example 1.

Cylinders prepared according to the foregoing method showed a disintegration rate of 0.82 g./day in a fistulated cow, releasing approximately 1.7 mg. of steroid per day for 31 days.

EXAMPLE 4

Formulation A

| Ingredient: | Amount, G. |
|---|---|
| Carnauba wax | 40 |
| Glyceryl monostearate | 90 |
| Bismuth subnitrate | 120 |
| 17α-ethynyl-19-nortestosterone | 2.3 |

Formulation B

| | |
|---|---|
| Carnauba wax | 80 |
| Glyceryl monostearate | 40 |
| Bismuth subnitrate | 130 |
| 17α-ethynyl-19-nortestosterone | 3.9 |

For each of the foregoing formulations, the glyceryl monostearate and carnauba wax were melted and thoroughly mixed. The steriod was then dissolved in this molten mixture and the bismuth subnitrate was next added. This molten mass was mixed well and then poured into 10 molds, each .75 in. wide and 1.75 in. high, and allowed to solidify. Upon testing in a rotating bottle apparatus [Souder et al., Drug Standards, 26, 77 (1958)], each was found to release approximately 10 mg. per day, Formulation A however released this dosage over approximately a 23 day period, while Formulation B released this dosage over approximately a 39 day period.

EXAMPLE 5

| Ingredient: | Amount/composition |
|---|---|
| Glyceryl monostearate | g— 9 |
| Polyethylene glycol | g— 1 |
| Barium sulfate | g— 15 |
| 6 - chloro - 17α - acetoxy-$\Delta^{4,6}$-pregnadiene-3,20-dione | mg— 60 |

The above ingredients are combined according to the procedure of Example 1 and compressed into 25 g. cylinders (1 inch in length and 0.5 inch in radius) at pressures of 500 lbs./in.$^2$, 1500 lbs./in.$^2$ and 4500 lbs./in.$^2$. These cylinders were tested, in replicates of six, on the rotating bottle apparatus described in Example 4 and examined periodically to determine percent disintegration.

| | Percent disintegration | | |
|---|---|---|---|
| | 500 lbs./in.$^2$ | 1,500 lbs./in.$^2$ | 4,500 lbs./in.$^2$ |
| Time, hours: | | | |
| 4.5 | 6.5 | 2.3 | 1.6 |
| 28 | 67 | 23.9 | 16.7 |
| 51.75 | 99 | 53.9 | 42.8 |

EXAMPLE 6

| Ingredient: | Amount/composition |
|---|---|
| Polyethylene glycol | g— 2 |
| Glyceryl monostearate | g— 8 |
| Barium sulfate | g— 15 |
| 6 - chloro - 17α - acetoxy-$\Delta^{4,6}$-pregnadiene-3,20-dione | mg— 45 |

Cylinders of 0.5 in. radius and 1 in. length were prepared according to the procedure of Example 1, using the above proportions. One such cylinder was administered to each of four normally cycling heifers whose previous date of last estrus was unknown (but who were estimated by rectal examination to be in from the tenth to the fifteenth day of their cycle). Estrus followed in all four animals on an average of 14 days after treatment.

| Animal: | Days to estrus |
|---|---|
| (A) | 15 |
| (B) | 14 |
| (C) | 13 |
| (D) | 14 |

A fifth heifer was treated in a similar manner two days after the other four. This heifer was known to be in its sixth day of cycle. Estrus followed in 15 days after treatment.

EXAMPLE 7

| Ingredient | Amount (g./composition) | | |
|---|---|---|---|
| | Formulation C | Formulation D | Formulation E |
| Barium sulfate | 15.00 | 15.00 | 15.00 |
| Stearic acid | 2.00 | 5.00 | 8.00 |
| Stearamide | 8.00 | 5.00 | 2.00 |
| 6-chloro-17α-acetoxy-$\Delta^{4,6}$-pregnadiene-3,20-dione | 0.06 | 0.06 | 0.06 |

Cylinders were prepared according to the procedure of Example 1, utilizing however 2000 lbs./in.$^2$ pressure.

Upon in vitro testing in the manner previously described, the following rates of disintegration were observed.

|  | Time, hours | Cylinder weight |
|---|---|---|
| Formulation C | 0 | 24.8 |
|  | 5½ | 24.3 |
|  | 21½ | 18.3 |
|  | 28 | 6.5 |
|  | 44¾ | 1.2 |
| Formulation D | 0 | 24.8 |
|  | 6½ | 24.6 |
|  | 23¼ | 23.6 |
|  | 27¼ | 22.7 |
|  | 43¼ | 20.1 |
|  | 50¼ | 18.7 |
|  | 57¼ | 17.8 |
|  | 73¾ | 15.9 |
|  | 76¾ | 14.5 |
|  | 92¾ | 11.6 |
|  | 99¾ | 10.4 |
|  | 115¾ | 7.9 |
|  | 122¼ | 7.1 |
|  | 130¼ | 4.8 |
| Formulation E | 0 | 24.8 |
|  | 6 | 24.8 |
|  | 22 | 24.6 |
|  | 29 | 24.5 |
|  | 36 | 24.4 |
|  | 52½ | 24.3 |
|  | 60 | 24.3 |
|  | 76 | 24.3 |
|  | 83 | 24.3 |
|  | 99 | 24.1 |
|  | 105½ | 24.0 |
|  | 122½ | 23.9 |
|  | 128½ | 23.9 |

We claim:

1. A solid, non-toxic veterinary composition useful for ruminant fertility control and timing and capable, upon oral administration to an estrus cycling ruminant, of lodging in the rumeno-reticular portions of the stomach and of totally disintegrating therein gradually over an extended but finite, predetermined period, said composition comprising a uniform and compressed mixture of at least one highly water insoluble wax, fat, oil, fatty acid, fatty acid ester, fatty acid amide, fatty acid alcohol, or polymer having a melting point above 50° C.; an orally active estrus synchronizing progestational agent in a total predetermined amount sufficient to release the minimum effective daily estrus suppressing dosage over the total predetermined period of disintegration; and a non-toxic, high density, water insoluble metal salt, said salt being present in an amount sufficient to provide the entire composition with a density of at least 1.5 g./cm.$^3$.

2. A solid, non-toxic veterinary composition useful for ruminant fertility control and timing and capable, upon oral administration to an estrus cycling ruminant, of lodging in the rumeno-reticular portions of the stomach and of totally disintegrating therein gradually over an extended but finite, predetermined time, said composition comprising a mixture of glyceryl monostearate and polyethylene glycol, there being at least 1.5 times as much glyceryl monostearate as polyethylene glycol, an orally active estrus synchronizing progestational agent in a total predetermined amount sufficient to release at least the minimum effective daily estrus suppressing dosage over the total predetermined period of disintegration, and barium sulfate in an amount sufficient to provide the entire composition with a density of 1.5 gm./cm.$^3$.

3. A composition according to claim 2 wherein the amount of barium sulfate is sufficient to provide the entire composition with a density of at least 1.9 g./cm.$^3$.

4. A solid, non-toxic veterinary composition in accordance with claim 2, said composition comprising from about 40 to about 24 parts by weight of glyceryl monostearate, from 0 to about 16 parts by weight of polyethylene glycol, from 50 to 70 parts of weight of barium sulfate, and a quantity of 6-chloro-17α-acetoxy-Δ$^{4,6}$-pregnadiene-3,20-dione sufficient to release from 5 to 15 mg. per day over the total period of disintegration, said composition having a total weight of from 20 to 30 g. and being compressed at from 15 to 4000 lbs./in.$^2$.

5. A composition according to claim 4 having, exclusive of said 6-chloro-17α-acetoxy-Δ$^{4,6}$-pregnadiene-3,20-dione, about 35 parts by weight of glyceryl monostearate, about 5 parts by weight of polyethylene glycol and about 60 parts by weight of barium sulfate and having a total weight of about 25 g.

6. The method of supplying an estrus synchronizing progestational agent to an estrus cycling ruminant at a substantially fixed rate for an extended but finite, predetermined time which consist of orally administering said agent to said ruminant in a solid, non-toxic composition as defined by claim 1.

7. The method of timing estrus in an estrus cycling ruminant which consists of orally administering to said ruminant a composition as defined by claim 1, whereby said composition lodges in the rumeno-reticular portions of the stomach and therein releases said progestational agent over the composition's total, predetermined period of disintegration.

8. The method of timing estrus in an estrus cycling ruminant which consists of orally administering to said ruminant a composition as defined by claim 2 whereby said composition lodges in the rumeno-reticular portions of the stomach and therein releases said progestational agent over the composition's total, predetermined period of disintegration.

9. The method according to claim 8 wherein the composition has, exclusive of said 6-chloro-17α-acetoxy-Δ$^{4,6}$-pregnadiene-3,20-dione, about 35 parts by weight of glyceryl monostearate, about 5 parts by weight of polyethylene glycol, and about 60 parts by weight of barium sulfate and has a total weight of about 25 g.

References Cited

UNITED STATES PATENTS

| 3,146,169 | 8/1964 | Stephenson et al. | 167—82 |
| 2,793,979 | 5/1957 | Svedres | 167—82 |
| 2,897,121 | 7/1959 | Wagner | 167—82 |
| 2,918,411 | 12/1959 | Hill | 167—82 |
| 2,965,541 | 12/1960 | Byrnes | 167—82 |
| 2,993,836 | 7/1961 | Nash et al. | 167—82 |
| 3,056,724 | 10/1962 | Marston | 167—53 |
| 3,139,383 | 6/1964 | Neville | 167—82 |

FOREIGN PATENTS

| 972,128 | 10/1964 | Great Britain. |
| 936,386 | 9/1963 | Great Britain. |

OTHER REFERENCES

Skerman et al., Am. J. Vet. Res. 20; 977–984, November 1959.

SHEP K. ROSE, Primary Examiner

U.S. Cl. X.R.

424—243